J. W. TOOLE.
HOSE HANDLER.
APPLICATION FILED JUNE 12, 1912.
1,058,926.
Patented Apr. 15, 1913.
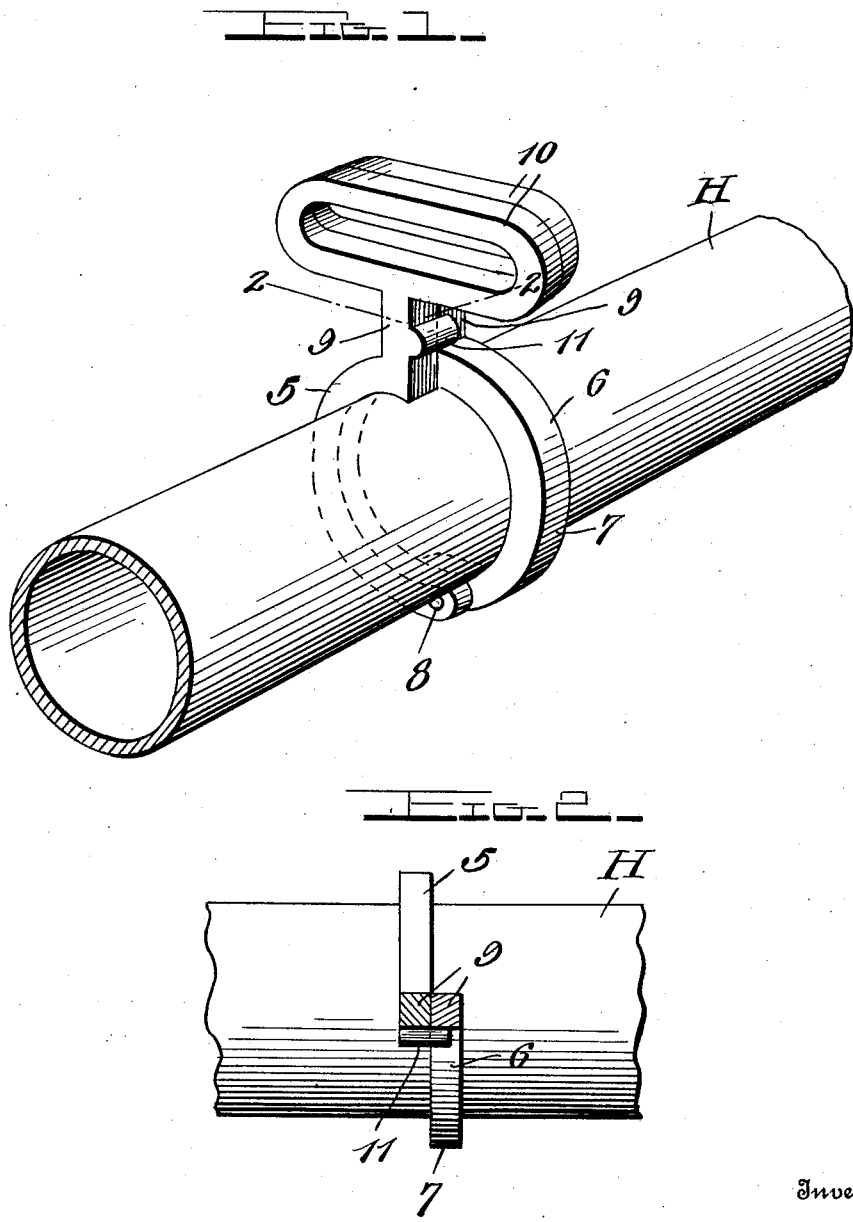

UNITED STATES PATENT OFFICE.

JOHN W. TOOLE, OF BANGOR, MAINE.

HOSE-HANDLER.

1,058,926.  Specification of Letters Patent.  Patented Apr. 15, 1913.

Application filed June 12, 1912. Serial No. 703,330.

*To all whom it may concern:*

Be it known that I, JOHN W. TOOLE, a citizen of the United States, residing at Bangor, in the county of Penobscot and State of Maine, have invented certain new and useful Improvements in Hose-Handlers, of which the following is a specification, reference being had to the accompanying drawings.

This invention relates to hose handlers and has for its primary object to provide an inexpensive, simple and durable device which may be easily and quickly attached to the hose whereby the same may be readily moved from place to place.

Another object of the invention resides in the provision of a device for handling fire hose which consists of two pivotally connected members adapted for clamping engagement upon the hose, and means carried by one of said members for engagement with the other member, to retain the same in position upon the hose and prevent their pivotal movement.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawing in which—

Figure 1 is a perspective view of a hose handling device embodying the present invention showing the same engaged upon the hose; and Fig. 2 is a section taken on the line 2—2 of Fig. 1.

Corresponding and like parts are referred to in the following description and designated in the accompanying drawing by like reference characters.

Referring in detail to the drawing 5 designates one of the hose clamping members and 6 the other member which is opposed thereto. These clamping members each embody a semi-circular curved portion 7 which is adapted for engagement upon one side of the hose indicated at H. The curved portions 7 of the members 5 and 6 are loosely pivoted together at one of their ends as indicated at 8, and are capable of a slight relative lateral movement. The clamping members are formed at the other ends of their curved portions 7 with angular extensions 9 upon the ends of which the hand loops 10 are formed. Upon one of the side faces of the extension 9 of the member 5 a laterally disposed lug 11 is formed, said lug being disposed longitudinally of the hose when the device is applied thereto and adapted for engagement upon the corresponding face of the extension 9 of the other clamping member 6.

In the application of the device to the hose, the curved portions 7 of the members 5 and 6 are disposed upon opposite sides of the hose, and the clamping members moved toward each other. These clamping members are also moved in opposite lateral directions or longitudinally of the hose and the extension 9 of the member 6 engaged upon the projecting end portion of the lug 11 on the member 5, as clearly shown in Fig. 1 of the drawings. When thus disposed the opposed faces of the extensions 9 of the clamping members and the hand loops 10 are engaged, and the lug 11 retains the clamping members in this position and obviates liability of their pivotal movement in opposite directions which would release the same from the hose. The fingers of the hand are now passed through the loops 10 and said loops firmly grasped.

From the above the construction and manner of attachment of my improved hose handling device will be clearly understood. By means of the same the hose may be moved with one hand while the fireman may ascend the ladder by grasping the rungs thereof with the other hand. Thus the movement of the hose from place to place may be easily and quickly effected with the exercise of a minimum of exertion upon the part of the fireman. Owing to the extreme simplicity of the device, it will be obvious that the same is strong, durable and may be produced at comparatively small cost.

While I have shown and described the preferred construction and arrangement of the various parts, it will be understood that the invention is susceptible of considerable modification without departing from the essential features or sacrificing any of the advantages thereof.

Having thus described the invention what is claimed is:

A hose handling device comprising two similar members loosely pivoted together at one of their ends, said members each consisting of a single bar having a semicircular portion for engagement upon one side of the hose and an angular extension on one end of said semicircular portion, a hand loop formed upon the end of said extension, a laterally disposed lug formed upon one face of the extension of one of said members, the extension of the other of said members being adapted to be disposed behind said lug whereby relative pivotal movement of said members is prevented and the same are retained in position upon the hose, the said hand loops on the ends of the extensions being disposed in close engagement upon each other when in closed position to constitute a handle whereby the hose may be moved from place to place.

In testimony whereof I hereunto affix my signature in the presence of two witnesses.

JOHN W. TOOLE.

Witnesses:
GEORGE B. DYER,
MARGARET W. HYNES.

Copies of this patent may be obtained for five cents each, by addressing the "Commissioner of Patents, Washington, D. C."